(12) United States Patent
Tsutsumi

(10) Patent No.: US 10,054,028 B2
(45) Date of Patent: Aug. 21, 2018

(54) ABNORMALITY DETECTION METHOD FOR AFTER TURBO CATALYST

(71) Applicant: HINO MOTORS, LTD., Hino-shi (JP)

(72) Inventor: Munechika Tsutsumi, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 14/892,127

(22) PCT Filed: Jul. 8, 2014

(86) PCT No.: PCT/JP2014/068181
§ 371 (c)(1),
(2) Date: Nov. 18, 2015

(87) PCT Pub. No.: WO2015/005339
PCT Pub. Date: Jan. 15, 2015

(65) Prior Publication Data
US 2016/0090888 A1    Mar. 31, 2016

(30) Foreign Application Priority Data

Jul. 10, 2013   (JP) .................. 2013-144159

(51) Int. Cl.
*F01N 3/00*        (2006.01)
*F01N 5/04*        (2006.01)
(Continued)

(52) U.S. Cl.
CPC .............. *F01N 11/00* (2013.01); *F01N 3/208* (2013.01); *F01N 3/2033* (2013.01);
(Continued)

(58) Field of Classification Search
CPC ...... F01N 11/00; F01N 11/002; F01N 3/0821; F01N 3/103; F01N 3/2033; F01N 3/208;
(Continued)

(56) References Cited

U.S. PATENT DOCUMENTS 8,973,431 B2 *   3/2015   Nagaoka ............ B01D 53/9409
                                                          73/114.69
2004/0159099 A1 *  8/2004   Kuboshima ............. F01N 9/002
                                                            60/297
(Continued)

FOREIGN PATENT DOCUMENTS

JP        2003-172185 A    6/2003
JP         2007-71130 A    3/2007
(Continued)

OTHER PUBLICATIONS

International Search Report dated Sep. 30, 2014, in PCT/JP2014/068181 filed Jul. 8, 2014.

*Primary Examiner* — Audrey K Bradley
*Assistant Examiner* — Diem Tran
(74) *Attorney, Agent, or Firm* — Oblon, McClelland, Maier & Neustadt, L.L.P.

(57) ABSTRACT

Provided is a method for detecting abnormality of an after turbo catalyst (ATC) where fuel from a fuel injection device receiving a post injection command from a controller undergoes oxidation reaction in an exhaust pipe and resultant reaction heat heats the exhaust gas, which provides an ATC-entry-side temperature measuring means measuring a temperature on an entry side of ATC to transmit a measured value to the controller and an ATC-downstream-side temperature measuring means measuring a temperature downstream of ATC. The controller, which transmitted the post injection command, determines whether a fuel injection device normally operates if temperature downstream of ATC is not nonelevated to that on the entry side of ATC, and determines that ATC has abnormality if the fuel injection device normally operates.

4 Claims, 3 Drawing Sheets

(51) Int. Cl.
*F01N 3/02* (2006.01)
*F01N 11/00* (2006.01)
*F02B 37/00* (2006.01)
*F02D 41/02* (2006.01)
*F02D 41/20* (2006.01)
*F02D 41/40* (2006.01)
*F01N 3/20* (2006.01)
*F01N 3/08* (2006.01)
*F01N 3/10* (2006.01)
*F02D 41/14* (2006.01)
*F02D 41/22* (2006.01)
*F02D 41/38* (2006.01)

(52) U.S. Cl.
CPC ............ *F01N 11/002* (2013.01); *F02B 37/00* (2013.01); *F02D 41/024* (2013.01); *F02D 41/20* (2013.01); *F02D 41/405* (2013.01); *F01N 3/0821* (2013.01); *F01N 3/103* (2013.01); *F01N 2550/02* (2013.01); *F02D 41/1441* (2013.01); *F02D 41/22* (2013.01); *F02D 41/3809* (2013.01); *F02D 2041/2034* (2013.01); *F02D 2200/0802* (2013.01); *Y02T 10/144* (2013.01); *Y02T 10/26* (2013.01); *Y02T 10/44* (2013.01); *Y02T 10/47* (2013.01)

(58) Field of Classification Search
CPC ........ F02D 41/20; F02D 41/22; F02D 41/024; F02D 41/1441; F02D 41/3809; F02D 41/405; Y02T 10/44; Y02T 10/47; Y02T 10/26; Y02T 10/144
USPC .......................... 60/276, 277, 280, 286, 299
See application file for complete search history.

(56) References Cited

U.S. PATENT DOCUMENTS

2010/0300073 A1* 12/2010 Khair ...................... F01N 3/035
60/285
2013/0306171 A1 11/2013 Nagaoka et al.

FOREIGN PATENT DOCUMENTS

| JP | 2009-52408 A | 3/2009 |
| JP | 2009-293455 | * 12/2009 |
| JP | 2011-247195 A | 12/2011 |
| JP | 2012-127302 A | 7/2012 |
| JP | 2013-122182 A | 6/2013 |

* cited by examiner

ABNORMALITY DETECTION METHOD FOR AFTER TURBO CATALYST

TECHNICAL FIELD

The present invention relates to a method for detecting any abnormality in an after turbo catalyst for satisfaction of OBD2 (On Board Diagnosis second generation) requirements.

BACKGROUND ART

Nowadays worldwide desire in diesel automobiles is to reduce particulate matters (hereinafter referred to as PM) in diesel exhaust gas. As a measure for reducing PM, an exhaust emission control device has been equipped for depuration of the exhaust gas.

The exhaust emission control device is provided with, for example, a particulate filter. The particulate filter has a porous honeycomb structure made of ceramics such as cordierite and having lattice-like compartmentalized passages; alternate ones of the passages have plugged inlets and the remaining passages with unplugged open inlets have plugged outlets. Only the exhaust gas passing through thin porous walls compartmentalizing the respective passages is discharged downstream while PM in the exhaust gas are captured by inner surfaces of the walls.

PM in the exhaust gas captured by the inner surfaces of the thin porous walls accumulate. Thus, PM require to be properly burnt off for regeneration of the particulate filter before exhaust resistance increases due to clogging.

Various ideas have been proposed since, in the diesel automobile with a normal operation state, the exhaust has little chance to reach a temperature at which PM ignite by themselves. For example, an oxidation catalyst with active species of, for example, Pt and Pd is integrally carried by the particulate filter to facilitate oxidation reaction of the captured PM to thereby lower an ignition temperature. Thus, PM are burnt off at an exhaust temperature lower than that in a structure with no oxidation catalyst.

However, even in the case of the diesel automobile employing the particulate filter integrally carrying the oxidation catalyst, a captured amount of PM may exceed a treated amount in an operation area having a lower exhaust temperature level. Continued operation at such lower exhaust temperature level may hinder sufficient regeneration of the particulate filter, resulting in excessive accumulation of the captured PM in the particulate filter.

Thus, the diesel automobile is provided with a flow-through type oxidation catalyst on an entry side of a particulate filter. Moreover, some vehicles have an after turbo catalyst (hereinafter referred to as ATC) downstream of a turbocharger.

In a step where an accumulated amount of PM has increased, using a fuel injection device, main injection of fuel near a compression upper dead center is followed by post injection at non-ignition timing after the compression upper dead center to thereby add the fuel to the exhaust gas in the exhaust pipe.

As a result, the added fuel undergoes oxidation reaction during passing of hydrocarbon through ATC and the oxidation catalyst. The exhaust gas is heated by resultant reaction heat. Then, the exhaust gas heated increases a catalyst bed temperature of the particulate filter arranged downstream. Thus, PM are burnt off to regenerate the particulate filter.

Advanced engine control is required for regeneration of the particulate filter. Thus, employed as the fuel injection device is, for example, a common rail type high-pressure fuel injection device which can conduct precise multiple injection.

CITATION LIST

Patent Literature

Patent Literature 1: JP 2003-172185A

SUMMARY OF INVENTION

Technical Problems

Registration of a new automobile in U.S.A. requires proof of being an automobile matched to OBD requirements. The OBD requirements require monitoring of parts which may fail into deterioration in exhaust emission; ATC with an oxidation catalyst is also one of targets to be monitored. Thus, the invention provides a method for detecting any abnormality in an after turbo catalyst.

Solution to Problems

The invention is directed to a method for detecting any abnormality in an after turbo catalyst for oxidation reaction, in an exhaust pipe, of fuel from a fuel injection device by a post injection command from a controller, whereby resultant reaction heat heats exhaust gas. The method provides an ATC-entry-side temperature measuring means for measuring a temperature on an entry side of said after turbo catalyst to transmit a measured value to said controller and an ATC-downstream-side temperature measuring means for measuring a temperature downstream of said after turbo catalyst. The controller, which has transmitted the post injection command determines whether the fuel injection device normally operates if the temperature downstream of the after turbo catalyst is nonelevated relative to the temperature on an entry side of the after turbo catalyst, and determines that the after turbo catalyst has abnormality if the fuel injection device operates normally.

The fuel injection device comprises a supply pump for supplying the fuel under pressure, a common rail for storing the high-pressure fuel from the supply pump, a fuel flow control valve for controlling an amount of the fuel to be sucked from said supply pump to said common rail and injectors for injecting the high-pressure fuel stored in said common rail. Said controller, which has transmitted the post injection signal, determines whether the fuel injection device operates normally or abnormally on the basis of change in electric current flow energized for opening of the fuel flow control valve.

Advantageous Effects of Invention

A method for detecting any abnormality in an after turbo catalyst according to the invention can detect any abnormality in the after turbo catalyst.

DESCRIPTION OF EMBODIMENT

Figure 1:
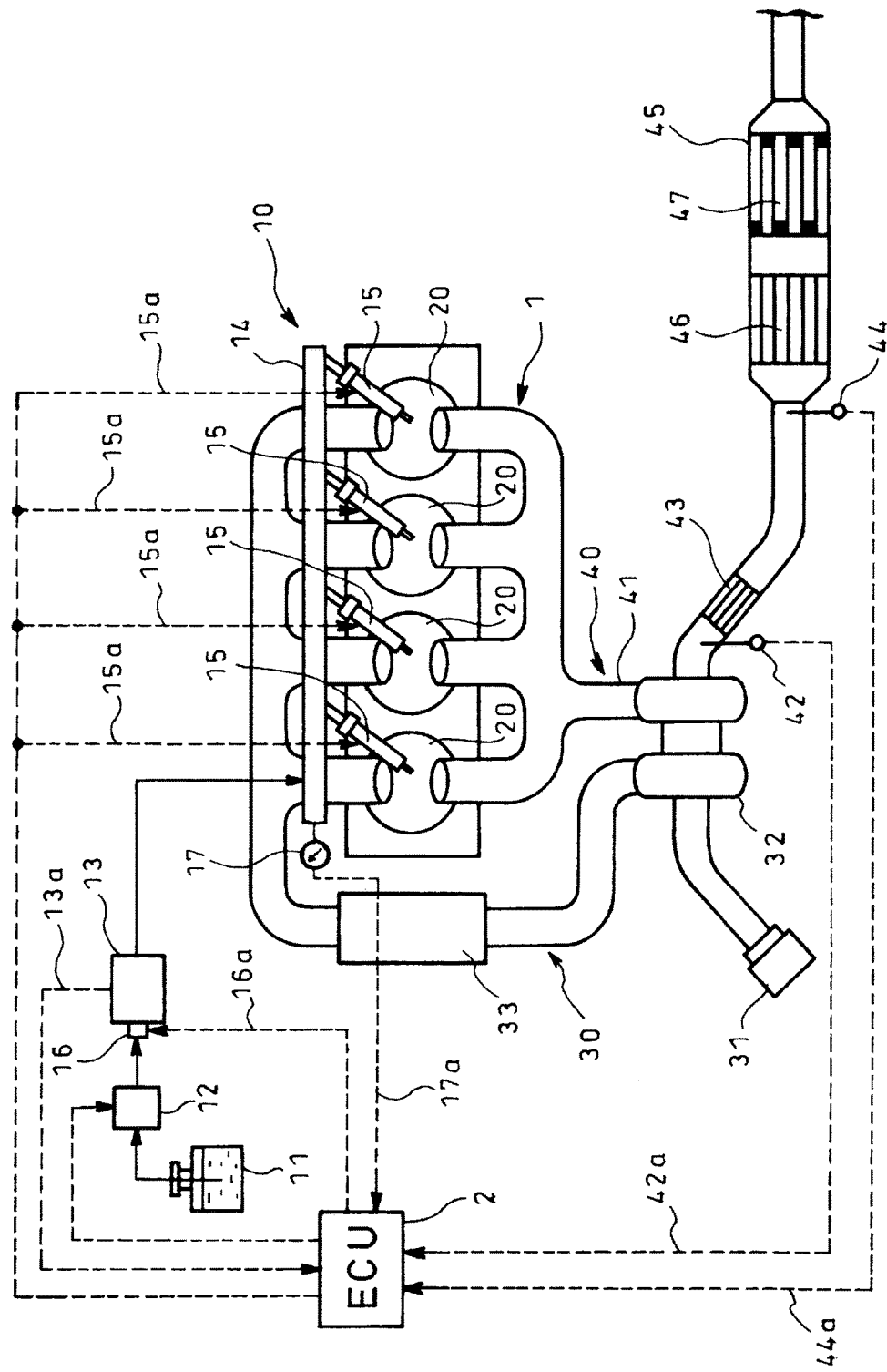
FIG. 1 is a schematic diagram showing an embodiment of the invention.

Next, an embodiment of the invention (hereinafter referred to as embodiment) will be described in conjunction with drawings. FIG. 1 is a schematic diagram showing the embodiment.

An internal combustion engine 1 is a diesel engine with in-line four cylinders. In the internal combustion engine 1, air-fuel mixture mixed in a proper air-fuel ratio and comprising air from a suction system 30 and fuel from a fuel injection device 10 controlled by a controller 2 is burnt in a combustion chamber 20 and then exhaust gas in the combustion chamber 20 is discharged to the atmosphere through an exhaust system 40.

The fuel injection device 10 comprises, in the order named from upstream, a fuel tank 11, an electric feed pump 12, a supply pump 13, a common rail 14 and injectors 15. The fuel tank 11 is a tank which stores fuel. The electric feed pump 12 is a pump which sucks the fuel from the fuel tank 11 and feeds the sucked fuel to the supply pump 13.

The supply pump 13 supplies the fuel to the common rail 14 under pressure. The supply pump 13 is provided with a fuel flow control valve (suction control valve; SCV) 16 which controls a flow rate of the fuel fed from the electric feed pump 12, i.e., controls a fuel amount sucked into the supply pump 13.

The fuel flow control valve 16 controls a pressure of the high-pressure fuel in the common rail 14 (hereinafter referred to as rail pressure) to a predetermined pressure. The fuel flow control valve 16 comprises an electromagnetic valve with a valve body continuously changed in position depending on electric current amount energized to adjust an opening area. The fuel flow control valve 16 in the embodiment is a normally open variable throttle which is fully open when no electric current is applied.

The common rail 14 is a pressure accumulator which accumulates the high-pressure fuel from the supply pump 13 to a predetermined pressure. The common rail 14 is provided with a pressure measuring means for measuring a pressure in the common rail 14. Concretely, it is a pressure gauge 17 which successively measures the rail pressure and transmits the same as a pressure signal 17a to the controller 2.

The injectors 15 are connected to the common rail 14 and are controlled by the controller 2 to open the electromagnetic valves at a predetermined timing and inject the high-pressure fuel in the common rail 14 into combustion chambers 20.

The suction system 30 takes in suction air through an air cleaner 31, compresses the suction air by a compressor of a turbocharger 32, cools by an intercooler 33 the suction air heated due to turbocharging, and supplies the suction air into the respective combustion chambers 20.

The exhaust system 40 comprises an exhaust pipe 41 which discharge the exhaust gas from the respective combustion chambers 20 to outside. The exhaust pipe 41 is provided with, in the order named from upstream, a turbine of the turbocharger 32, an ATC-entry-side temperature measuring means 42, an after turbo catalyst (ATC) 43, an ATC-downstream-side temperature measuring means 44, and an oxidation catalyst 46 and a particulate filter 47 encased by a casing 45.

The turbine of the turbocharger 32 is rotated by the exhaust gas to rotate a compressor connected integrally with the turbine.

ATC 43 causes the fuel injected from the fuel injection device 10 to undergo oxidation reaction in the exhaust pipe 41 and resultant reaction heat heats the exhaust gas flowing through the exhaust pipe 41. Arranged on an entry side of ATC 43 is the ATC-entry-side temperature measuring means 42 which measures an temperature on the entry side of ATC 43 and transmit a measured value to the controller 2.

The ATC-entry-side temperature measuring means 42 is, for example, a temperature gauge arranged on the entry side of ATC 43 to measure an inner temperature of the exhaust pipe 41 on the entry side of ATC 43, i.e., the temperature of the exhaust gas just before ATC 43 and transmits the same as a temperature signal 42a to the controller 2.

Arranged downstream of ATC 43 is the ATC-downstream-side temperature measuring means 44 which measures an temperature downstream of ATC 43. The ATC-downstream-side temperature measuring means 44 is, for example, a temperature gauge arranged on an entry side of the casing 45 which encases the oxidation catalyst 46 and the particulate filter 47 to measure an inner temperature of the exhaust pipe 41 on the entry side of the casing 45, i.e., the temperature of the exhaust gas just before the oxidation catalyst 46 and transmits the same as a temperature signal 44a to the controller 2.

The oxidation catalyst 46 and the particulate filter 47 are encased by the casing 45 such that the former and the latter are on the upstream and downstream sides, respectively. Because of being flow-through type, the oxidation catalyst 46 causes the added fuel into the exhaust gas upstream to undergo oxidation reaction during passing of the added fuel (HC) through the oxidation catalyst, so that resultant reaction heat heats the exhaust gas. The exhaust gas heated enhances a catalyst bed temperature of the particulate filter 47 downstream.

The controller 2 is an ECU (engine control unit) having, for example, a central processing unit (CPU), a read-only memory (ROM) and a random access memory (RAM) mutually connected one another through bidirectional buses.

The controller 2 serves for control on fuel injection. Specifically, a fuel injection signal 15a is outputted to the injectors 15 of the fuel injection device 10 which inject the fuel to the combustion chambers 20 in the internal combustion engine 1, on the basis of an accelerator opening degree signal from an accelerator sensor (not shown) detecting an accelerator opening degree as a load on the internal-combustion engine 1 and an rotation frequency signal from a rotation frequency sensor (not shown) detecting an engine rotation frequency of the internal-combustion engine 1.

In the controller 2, the fuel injection signal 15a in normal mode is determined on the basis of the accelerator opening degree and rotation frequency signals; when conducting fuel addition by post injection is required, the normal mode is changed into regeneration mode to transmit the fuel injection signal 15a to the injectors 15 such that main injection of the fuel near the compression upper dead center (crank angle 0°) is followed by post injection of the fuel at non-ignition timing after the compression upper dead center.

The controller 2 transmits the post injection signal (post injection command) 15a to the injectors 15. Then, the high-pressure fuel stored in the common rail 14 is injected through the respective electromagnetic valves in the injectors 15. As a result, the pressure gauge 17 transmits lowering in rail pressure as a pressure signal 17a to the controller 2.

Then, the controller 2, which has received the pressure signal 17a indicative of lowering in rail pressure, transmits a signal 16a to the fuel flow control valve 16 to expand the opening area. The fuel flow control valve 16, which has received the signal 16a indicative of expanding the opening area, lowers an electric current value energized for opening of the fuel flow control valve 16 to expand the opening area. With the opening area of the fuel flow control valve 16 being expanded, the fuel is supplied from the supply pump 13 to the common rail 14.

After transmitting the post injection signal 15a, the controller 2 compares the temperature downstream of ATC 43 with that on the entry side of ATC 43. When the temperature downstream of ATC 43 is nonelevated relative to the temperature on the entry side of ATC 43, the controller determines whether the fuel injection device 10 operates normally or abnormally; if the fuel injection device 10 operates normally, the controller determines that ATC 43 has abnormality.

Figure 2:
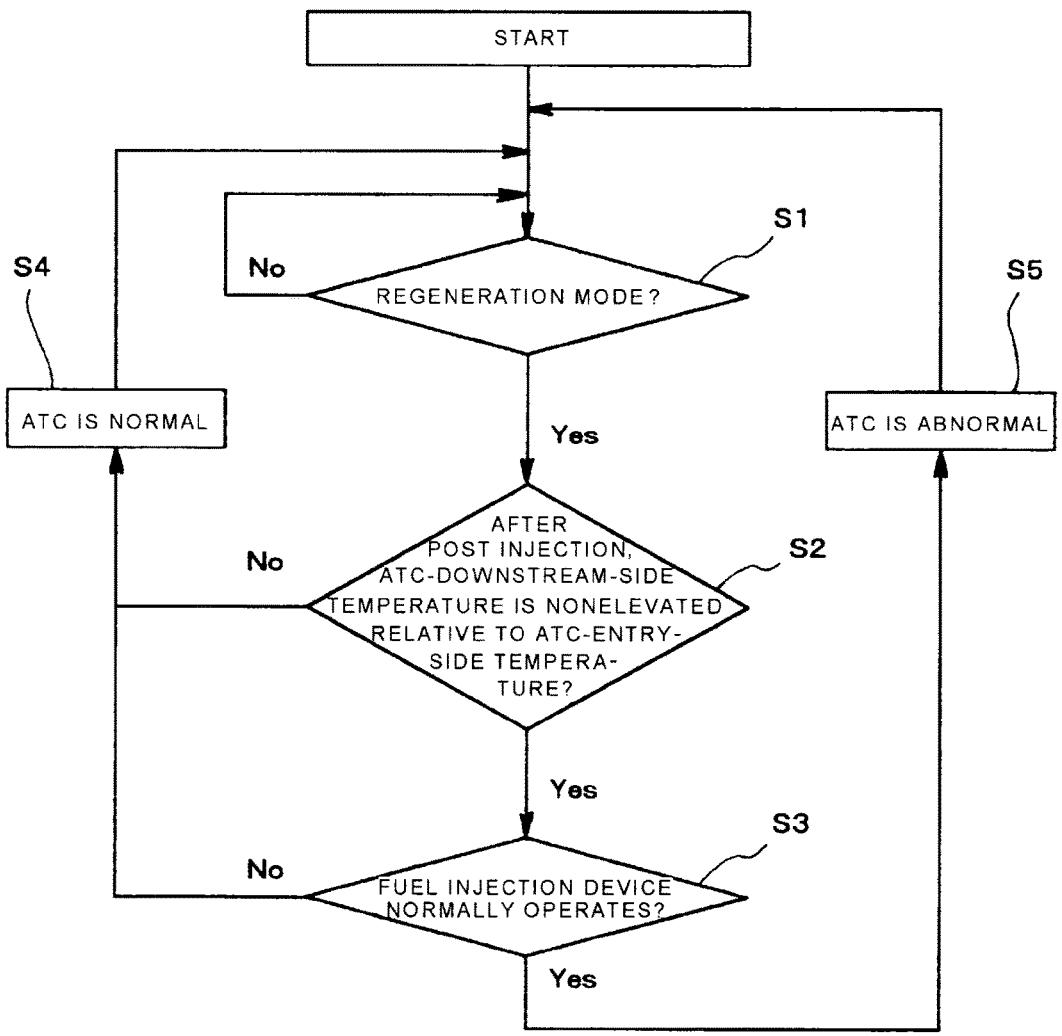
FIG. 2 is a flowchart on determination whether ATC functions normally or not.

Referring to the flowchart in FIG. 2, the method for detecting any abnormality of ATC 43 will be described specifically. FIG. 2 is the flowchart to determinate whether ATC 43 functions normally or not. As shown in FIG. 2, after the fuel injection is changed into regeneration mode in step 1, then the controller 2 determines in step S2 whether the temperature downstream of ATC after the post injection is nonelevated or not relative to the temperature on the entry side of ATC.

When elevated, the process proceeds to step S4 where it is determined that ATC 43 is normal. When nonelevated to the contrary, it is determined whether the fuel injection device 10 operates normally or not. If the fuel injection device 10 operates normally, the process proceeds to step S5 where it is determined that ATC 43 is abnormal; if the fuel injection device 10 does not normally operate to the contrary, it is determined that ATC 43 is normal. In the latter, indeed there may be a possibility that ATC 43 is also abnormal; however, there is very little possibility that both of the fuel injection device 10 and ATC 43 fail concurrently, so that as a matter of practical convenience it is determined that ATC 43 is normal. Thus, any abnormality of ATC 43 can be determined.

Figure 3:
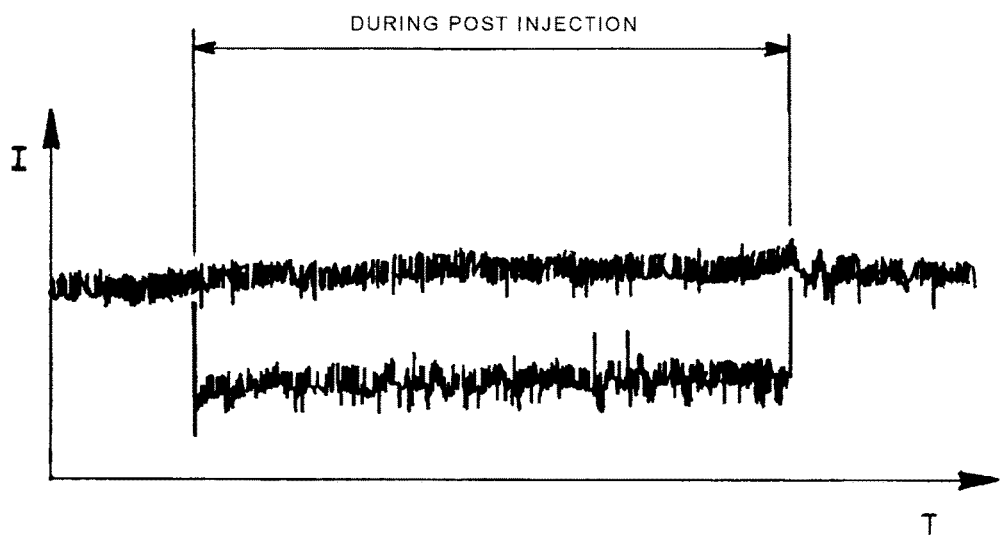
FIG. 3 is graphs showing relationships between time and electric current value energized for opening/closing of a fuel flow control valve during post injection being commanded.

Referring to FIG. 3, described is the method for determining whether the fuel injection device 10 operates normally or not, using an electric current value energized for opening/closing of the fuel flow control valve 16. FIG. 3 is graphs for showing relationships between time and electric current value energized for opening/closing of the fuel flow control valve 16 during the post injection being commanded. In FIG. 3, an ordinate and an abscissa represent electric current value I and time T, respectively.

In FIG. 3, the graph with the electric current value I being greatly lowered during the post injection is a graph showing the electric current value I being greatly lowered for the opening operation of the fuel flow control valve 16. With the post injection conducted, the controller 2 receives the pressure signal 17a representative of the rail pressure being lowered from the pressure gauge 17 to transmit the signal 16a indicative of expanding the opening area to the fuel flow control valve 16 thus lowering the electric current for valve opening. Specifically, when the electric current value I is greatly lowered during the post injection, it can be determined that the fuel injection device 10 operates normally.

In FIG. 3, the graph with substantially no change of the electric current value I during the post injection shows a phenomenon that, due to non-injection of the high-pressure fuel stored in the common rail 14, no opening operation of the fuel flow control valve 16 is conducted and thus the electric current value I is not greatly changed. With the post injection being normally conducted, the controller 2 receives the pressure signal 17a representative of the rail pressure being lowered from the pressure gauge 17. However, if the high-pressure fuel is not injected from the injectors 15 for some failure, the controller 2 receives no pressure signal 17a representative of the rail pressure of the common rail 14 being lowered from the pressure gauge 17, and as a result, conducts no operation of opening the fuel flow control valve 16. Specifically, when the electric current value I is not greatly changed during the post injection, it can be determined that the fuel injection device 10 operates normally.

In the above, the determination whether the fuel injection device 10 operates normally or not is made, using the electric current value I energized for opening/closing of the fuel flow control valve 16; this is not of restrictive nature. Alternatively, whether the fuel injection device 10 operates normally or not may be determined depending on, for example, whether lowering of the rail pressure of the common rail 14 occurs or not.

It is however to be noted that, as shown in FIG. 3, the electric current value I is kept greatly lowered whereas the rail pressure may vary. Thus, use of the electric current value I energized for opening/closing of the fuel flow control valve 16 is preferable for more accurate determination.

The description has been made with respect to the embodiment with the particulate filter 47 arranged downstream of ATC 43. However, the invention is not limited thereto; alternatively, for example, a NO storage reduction catalyst may be arranged downstream of ATC 43 so as to enhance a bed temperature of the catalyst.

It is to be understood that, in a method for detecting any abnormality of an after turbo catalyst according to the invention, various changes and modifications may be made without departing from the scope of the invention.

REFERENCE SIGNS LIST 2 controller
10 fuel injection device
12 electric feed pump
13 supply pump
14 common rail
15 injector
16 fuel flow control valve
17 pressure gauge
41 exhaust pipe
42 ATC-entry-side temperature measuring means
43 after turbo catalyst (ATC)
44 ATC-downstream-side temperature measuring means

The invention claimed is:

1. A method for detecting any abnormality in an after turbo catalyst (ATC) for oxidation reaction, in an exhaust pipe upstream of a casing which encases an oxidation catalyst and a particulate filter, of fuel from a fuel injection device by a post injection command from a controller, whereby resultant reaction heat heats exhaust gas, the method comprising:

measuring a temperature on an entry side of said after turbo catalyst to transmit a measured value to said controller; and measuring a temperature on an entry side of the casing, wherein the fuel injection device further comprises:

a supply pump to supply the fuel under pressure;

a common rail to store high-pressure fuel from the supply pump;

a fuel flow control valve to control an amount of the fuel to be sucked from said supply pump to said common rail; and injectors to inject the high-pressure fuel stored in said common rail into combustion chambers of an internal combustion engine, wherein said controller, which has transmitted the post injection signal, determines whether the fuel injection device operates normally or abnormally based on change in electric current flow energized for opening of the fuel flow control valve, wherein the controller, which has transmitted the post injection command, determines whether the fuel injection device operates normally when the temperature on the entry side of the casing is non-elevated relative to the temperature on an entry side of the after turbo catalyst, determines that the after turbo catalyst has abnormality when the fuel injection device operates normally, and determines that the after turbo catalyst is normal when the fuel injection device operates abnormally, and wherein, when the temperature on the entry side of the casing is elevated relative to the temperature on an entry side of the after turbo catalyst, the controller concludes that the after turbo catalyst operates normally.

2. A method for detecting any abnormality in an after turbo catalyst (ATC) for oxidation reaction, in an exhaust pine upstream of a casing which encases an oxidation catalyst and a particulate filter, of fuel from a fuel injection device by a post injection command from a controller, whereby resultant reaction heat heats exhaust gas, the method comprising:

measuring a temperature on an entry side of said after turbo catalyst to transmit a measured value to said controller; and measuring a temperature on an entry side of the casing, wherein said fuel injection device comprises:

a supply pump to supply the fuel under pressure;

a common rail to store high-pressure fuel from the supply pump;

a fuel flow control valve to control an amount of the fuel to be sucked from said supply pump to said common rail; and injectors to inject the high-pressure fuel stored in said common rail into combustion chambers of an internal combustion engine, wherein the controller, which has transmitted the post injection command, determines whether the fuel injection device operates normally based on whether or not a rail pressure of said common rail is lowered or not, wherein the controller, which has transmitted the post injection command, determines whether the fuel injection device operates normally when the temperature on the entry side of the casing is non-elevated relative to the temperature on an entry side of the after turbo catalyst, determines that the after turbo catalyst has abnormality when the fuel injection device operates normally, and determines that the after turbo catalyst is normal when the fuel injection device operates abnormally, and wherein, when the temperature on the entry side of the casing is elevated relative to the temperature on an entry side of the after turbo catalyst, the controller concludes that the after turbo catalyst operates normally.

3. A system for detecting any abnormality in an after turbo catalyst (ATC) for oxidation reaction, in an exhaust pipe upstream of a casing which encases an oxidation catalyst and a particulate filter, of fuel from a fuel injection device, whereby resultant reaction heat heats exhaust gas, the system comprising:

a fuel injection device;

a controller to transmit a post injection command;

an ATC-entry-side temperature measuring sensor to measure a temperature on an entry side of said after turbo catalyst to transmit a measured value to said controller; and an ATC-downstream-side temperature measuring sensor to measure a temperature on an entry side of the casing, wherein said fuel injection device comprises:

a supply pump to supply the fuel under pressure;

a common rail to store high-pressure fuel from the supply pump;

a fuel flow control valve to control an amount of the fuel to be sucked from said supply pump to said common rail; and injectors to inject the high-pressure fuel stored in said common rail into combustion chambers of an internal combustion engine, wherein said controller, which has transmitted the post injection signal, determines whether the fuel injection device operates normally or abnormally based on change in electric current flow energized for opening of the fuel flow control valve, wherein the controller determines whether the fuel injection device operates normally when the temperature on the entry side of the casing is non-elevated relative to the temperature on an entry side of the after turbo catalyst, determines that the after turbo catalyst has abnormality when the fuel injection device operates normally, and determines that the after turbo catalyst is normal when the fuel injection device operates abnormally, and wherein, when the temperature on the entry side of the casing is elevated relative to the temperature on an entry side of the after turbo catalyst, the controller concludes that the after turbo catalyst operates normally.

4. A system for detecting any abnormality in an after turbo catalyst (ATC) for oxidation reaction, in an exhaust pipe upstream of a casing which encases an oxidation catalyst and a particulate filter, of fuel from a fuel injection device, whereby resultant reaction heat heats exhaust gas, the system comprising:

a fuel injection device;

a controller to transmit a post injection command;

an ATC-entry-side temperature measuring sensor to measure a temperature on an entry side of said after turbo catalyst to transmit a measured value to said controller; and an ATC-downstream-side temperature measuring sensor to measure a temperature on an entry side of the casing, wherein said fuel injection device comprises:

a supply pump to supply the fuel under pressure;

a common rail to store high-pressure fuel from the supply pump;

a fuel flow control valve to control an amount of the fuel to be sucked from said supply pump to said common rail; and injectors to inject the high-pressure fuel stored in said common rail into combustion chambers of an internal combustion engine, wherein the controller, which has transmitted the post injection command, determines whether the fuel injection device operates normally based on whether or not a rail pressure of said common rail is lowered or not, wherein the controller determines whether the fuel injection device operates normally when the temperature on the entry side of the casing is non-elevated relative to the temperature on an entry side of the after turbo catalyst, determines that the after turbo catalyst has abnormality when the fuel injection device operates normally, and determines that the after turbo catalyst is normal when the fuel injection device operates abnormally, and wherein, when the temperature on the entry side of the casing is elevated relative to the temperature on an entry side of the after turbo catalyst, the controller concludes that the after turbo catalyst operates normally.

* * * * *